United States Patent
Dodds

(10) Patent No.: US 7,283,152 B2
(45) Date of Patent: Oct. 16, 2007

(54) COLLIMATION ASSEMBLY WITH AN ADJUSTMENT BRACKET CAPABLE OF FLEXING WHEN RECEIVING A LIGHT SOURCE

(75) Inventor: Dana Allen Dodds, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 168 days.

(21) Appl. No.: 11/114,623

(22) Filed: Apr. 26, 2005

(65) Prior Publication Data

US 2006/0238605 A1    Oct. 26, 2006

(51) Int. Cl.
  *B41J 27/00*  (2006.01)
  *B41J 15/14*  (2006.01)
(52) U.S. Cl. ............... 347/257; 347/256; 347/241; 347/242
(58) Field of Classification Search ........ 347/256–257, 347/238, 241–242
  See application file for complete search history.

(56) References Cited

U.S. PATENT DOCUMENTS

| | | | | |
|---|---|---|---|---|
| 4,843,530 A | * | 6/1989 | Mori et al. | 362/413 |
| 5,130,854 A | * | 7/1992 | Suzuki | 359/823 |
| 5,257,138 A | * | 10/1993 | Yamaguchi et al. | 359/819 |
| 5,870,133 A | * | 2/1999 | Naiki | 347/247 |
| 6,343,092 B1 | | 1/2002 | Naoe et al. | |
| 6,933,960 B1 | * | 8/2005 | Chee et al. | 347/257 |
| 2004/0100673 A1 | * | 5/2004 | Sakai et al. | 359/216 |
| 2005/0206717 A1 | * | 9/2005 | Boyatt et al. | 347/242 |
| 2006/0215724 A1 | * | 9/2006 | Sesko | 372/107 |

OTHER PUBLICATIONS

U.S. Appl. No. 10/805,059, filed Mar. 19, 2004, Boyatt, III, et al. entitled Collimation Assembly for Adjusting Laser Light Sources in a Multi-Beamed Laser Scanning Unit (pending application).

* cited by examiner

*Primary Examiner*—Hai Pham
*Assistant Examiner*—Kalnoa BK Wright
(74) *Attorney, Agent, or Firm*—Stevens & Shawalter, LLP

(57) ABSTRACT

A collimation assembly is associated with a printhead housing for generating a substantially collimated laser beam. The collimation assembly comprises: a collimation housing mounted to the printhead housing to support a collimation lens; an adjustment bracket positioned adjacent the collimation housing; and a light source generating a light beam. The adjustment bracket comprises a mount member for receiving the light source such that the light beam is directed toward the collimation lens. The mount member may include first and second sections and a hinge defined between the first and second sections so as to allow the mount member to flex when receiving the light source.

16 Claims, 7 Drawing Sheets

COLLIMATION ASSEMBLY WITH AN ADJUSTMENT BRACKET CAPABLE OF FLEXING WHEN RECEIVING A LIGHT SOURCE

BACKGROUND OF THE INVENTION

1. Field of the Invention

The present invention relates to an electrophotographic imaging apparatus, and more particularly, to a collimation assembly provided with an adjustment bracket capable of flexing to receive a light source.

2. Description of Related Prior Art

Optical systems used in laser printers may be characterized as having three sub-systems or assemblies, namely, a laser diode/pre-scan optical assembly, a scanning assembly, and a post-scan assembly. Typically, the laser diode/pre-scan optical assembly includes a laser diode emitting a diverging laser beam, a collimation lens for collimating the beam emitted by the laser diode, and a pre-scan lens to focus the beam in a process direction prior to it striking the scanning device. During manufacturing, the distance between the collimation lens and the laser diode may be varied so as to focus the beam generated by the laser diode relative to the collimation lens. It would be desirable to have an improved laser diode/collimation lens mounting arrangement so as to more precisely locate the laser diode and collimation lens relative to one another.

SUMMARY OF THE INVENTION

The present invention provides a collimation assembly having an adjustment bracket for mounting a laser light source. The light source comprises a laser diode mounted within a generally cylindrical holder. The adjustment bracket comprises a mount member with an inner surface for receiving the cylindrical holder. The holder is moved in an axial direction relative to the mount member to adjust the focus of a light beam generated by the laser diode relative to a collimation lens. Once the light beam has been focused, adhesive may be added between the holder and the mount member to secure them together. To permit the light source to be accurately adjusted relative to the mount member, it is preferred that there be a "light frictional slip fit" between the holder and the inner surface of the mount member. If there is little or no frictional engagement between the holder and the mount member, i.e., less than a light slip fit, then an adjusted location of the holder relative to the mount member may change prior to the two parts being permanently secured together such as by adhesive. Also, if the frictional engagement between the holder and the mount member is too great, accurate axial adjustment of the location of the holder relative to the mount member may be difficult to achieve.

The outer diameter of the holder may vary within a predefined first tolerance range while an inner diameter of the inner surface of the mount member may vary within a predefined second tolerance range. So as to maintain a light slip fit between the inner surface of the mount member and the holder for substantially any combination of parts falling within the first and second tolerance ranges, the mount member is provided with a hinge allowing it to flex as it receives the holder. Because the mount member is capable of flexing, one or both of the first and second tolerance ranges may be expanded beyond the ranges which would have been acceptable with a mount member without a hinge. Hence, the mount member with a hinge allows a light slip fit to be maintained between the holder and the mount member even if the outer diameter of the holder has a dimension at the upper limit of the first tolerance range and the inner diameter of the inner surface of the mount member has a dimension at the lower limit of the second tolerance range.

In accordance with a first aspect of the present invention, a collimation assembly is provided for generating a substantially collimated laser beam. The collimation assembly is associated with a printhead housing and comprises: a collimation housing mounted to the printhead housing to support a collimation lens; a light source generating a light beam; and an adjustment bracket located adjacent the collimation housing comprising a mount member for receiving the light source such that the light beam is directed toward the collimation lens. The mount member may include first and second sections and a hinge defined between the first and second sections so as to allow the mount member to flex when receiving the light source.

The adjustment bracket may be movable relative to the collimation housing along two axes of movement transverse to an axis of the light beam.

The adjustment bracket may include holes through which fasteners extend to attach the adjustment bracket to the collimation housing. The holes may comprise oversized holes for accommodating adjustment of the adjustment bracket relative to the collimation housing.

The light source may be capable of moving in a direction parallel to an axis of the light beam to adjust the distance between the light source and the collimation lens.

The light source may comprise a laser diode mounted within a generally cylindrical holder.

The mount member may include a plurality of ribs for engaging the cylindrical holder.

The mount member may include a slot portion extending at least a portion of the length of the mount member.

The adjustment bracket may further comprise a plate coupled to the mount member.

In accordance with a second aspect of the present invention, an adjustment bracket is provided for use in a collimation assembly of a laser beam scanner. The adjustment bracket comprises a mount member for receiving and supporting a light source. The mount member may include first and second sections and a hinge defined between the first and second sections to allow the mount member to flex when receiving the light source.

BRIEF DESCRIPTION OF THE DRAWINGS

The following detailed description of the preferred embodiments of the present invention can be best understood when read in conjunction with the following drawings, where like structure is indicated with like reference numerals, and in which.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
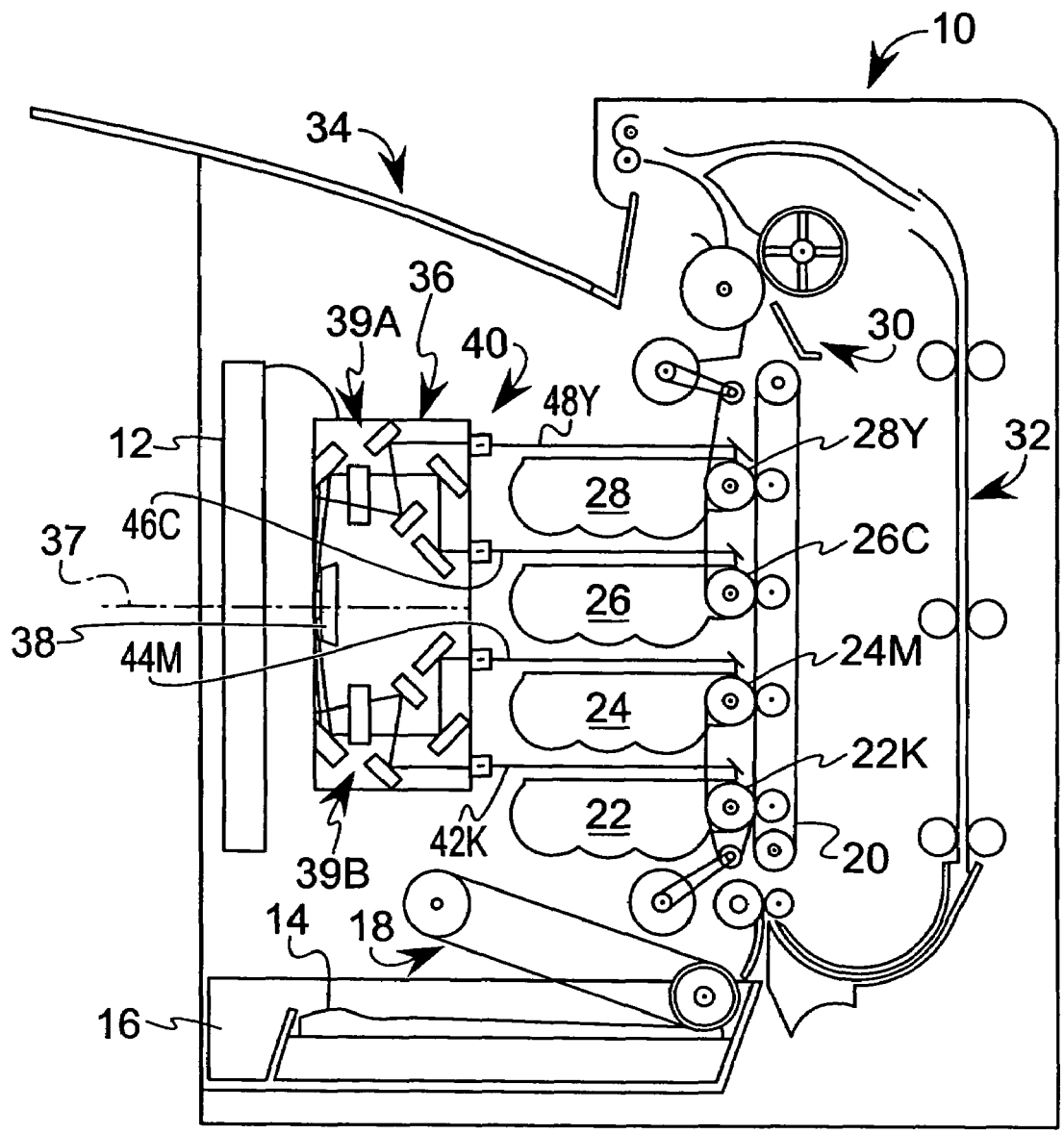
FIG. 1 is a side, schematic view of an exemplary electrophotographic imaging apparatus according to an embodiment of the present invention.

FIG. 1 depicts a representative electrophotographic image forming apparatus, such as a color laser printer, which is indicated generally by the numeral 10. An image to be printed is electronically transmitted to a controller 12 by an external device (not shown). The controller 12 includes system memory, one or more processors, and other logic necessary to control the functions of electrophotographic imaging.

In performing a printing operation, the controller 12 initiates an imaging operation where a top sheet 14 of a stack of media is picked up from a media tray 16 by a pick mechanism 18 and is delivered to a media transport belt 20. The media transport belt 20 carries the sheet 14 past each of four image forming stations 22, 24, 26, 28, which apply toner to the sheet 14. The image forming station 22 includes a photoconductive drum 22K that delivers black toner to the sheet 14 in a pattern corresponding to a black image plane of the image being printed. The image forming station 24 includes a photoconductive drum 24M that delivers magenta toner to the sheet 14 in a pattern corresponding to a magenta image plane of the image being printed. The image forming station 26 includes a photoconductive drum 26C that delivers cyan toner to the sheet 14 in a pattern corresponding to a cyan image plane of the image being printed. The image forming station 28 includes a photoconductive drum 28Y that delivers yellow toner to the sheet 14 in a pattern corresponding to a yellow image plane of the image being printed.

The media transport belt 20 then carries the sheet 14 with the unfixed toner image superposed thereon to a fuser assembly 30, which applies heat and pressure to the sheet 14 so as to promote adhesion of the toner thereto. Upon exiting the fuser assembly 30, the sheet 14 is either fed into a duplexing path 32 for performing a duplex printing operation on a second surface of the sheet 14, or the sheet 14 is conveyed from the apparatus 10 to an output tray 34.

Figure 2:
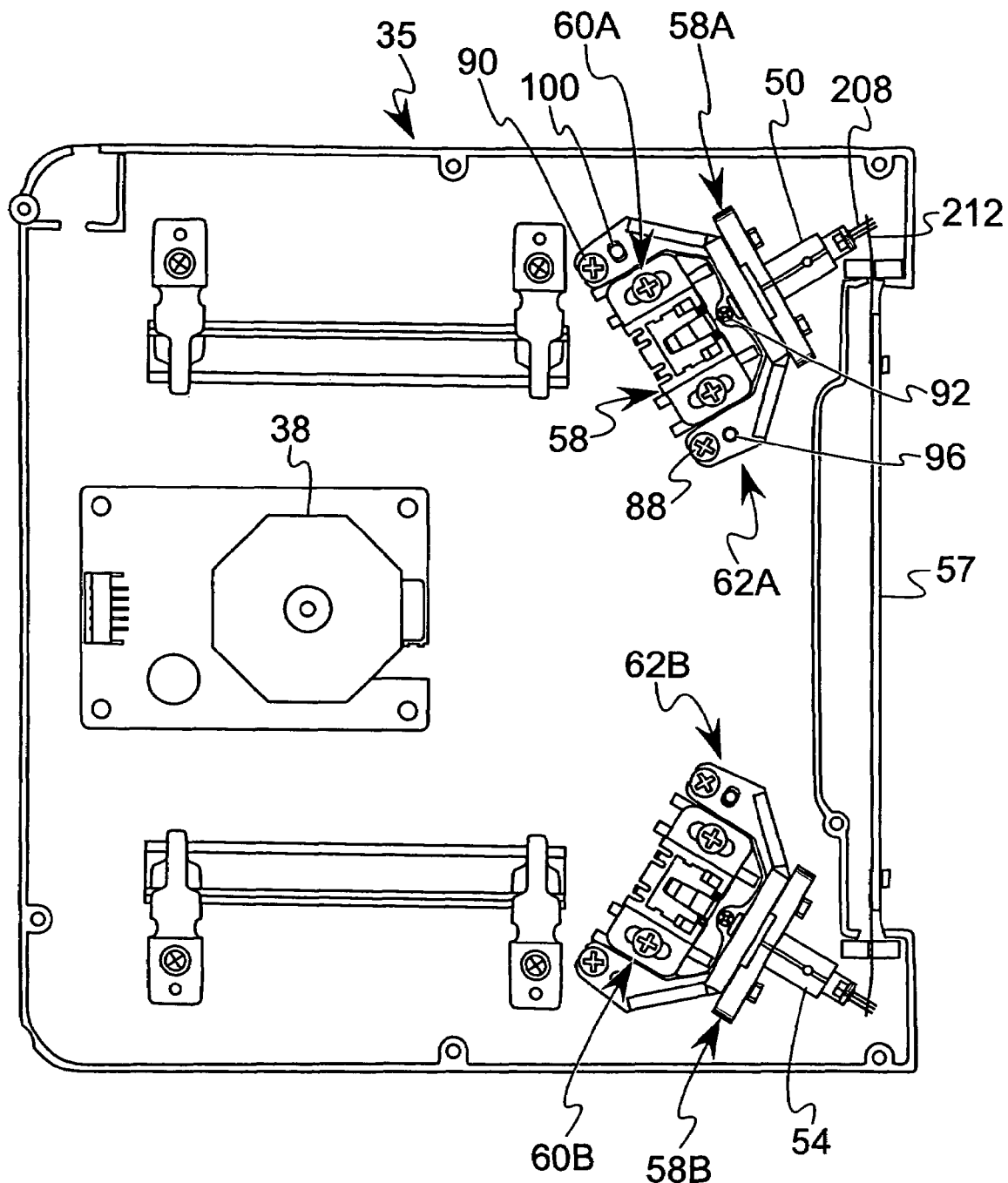
FIG. 2 is plan view illustrating a printhead incorporating two of the collimation assemblies of the present invention.

To effect the imaging operation, the controller 12 manipulates and converts data defining each of the YCMK image planes into separate corresponding laser pulse video signals, and the video signals are then communicated to a printhead 36. The printhead 36 comprises a printhead housing 35 (see FIG. 2), which is preferably formed as a molded component. The printhead 36 includes four laser light sources comprising laser light source pairs 50, 52 and 54, 56 forming part of respective collimation assemblies 58A and 58B (see FIGS. 2 and 3), and a pair of pre-scan lens assemblies 60A and 60B associated with the collimation assemblies 58A and 58B, where the associated collimation assemblies 58A, 58B and pre-scan lens assemblies 60A, 60B define pre-scan optical systems 62A and 62B. The printhead 36 additionally includes a single polygonal mirror 38 supported for rotation about a rotational axis 37, and post-scan optical systems 39A and 39B receiving the light beams emitted from the laser light sources 50, 52, 54, 56 forming part of the pre-scan optical systems 62A, 62B. The optics comprising the pre-scan optical systems 62A, 62B and post-scan optical systems 39A, 39B are referred to generally herein as the optical system 40. Each laser of the laser light sources 50, 52, 54, 56 generates a laser beam that is modulated according to an associated one of the video signals from the controller 12, as provided through a laser driver circuit board 57. In particular, laser light source 52 emits a laser beam 48Y that is modulated according to a video signal corresponding to the yellow image plane. Laser light source 50 emits a laser beam 46C that is modulated according to a video signal corresponding to the cyan image plane. Laser light source 54 emits a laser beam 44M that is modulated according to a video signal corresponding to the magenta image plane. Similarly, laser light source 56 emits a laser beam 42K that is modulated according to a video signal corresponding to the black image plane.

Each laser beam 42K, 44M, 46C, 48Y is reflected off the rotating polygonal mirror 38 and is directed towards a corresponding one of the photoconductive drums 22K, 24M, 26C and 28Y by select lenses and mirrors in the post-scan optical systems 39A, 39B. The rotation of the polygonal mirror 38 and positioning of the post-scan optics 39A, 39B causes each laser beam 42K, 44M, 46C, 48Y to sweep generally, in a scan direction, which is perpendicular to the plane of FIG. 1, across its corresponding photoconductive drum 22K, 24M, 26C and 28Y so as to form an image thereon.

As described above, each collimation assembly 58A, 58B has a pre-scan assembly 60A, 60B associated with it, located between the respective collimation assembly 58A, 58B and the polygonal mirror 38. The pre-scan assembly 60A includes a prescan lens 61A through which a pair of beams generated by the laser diodes 50 and 52 pass, and the pre-scan assembly 60B includes a prescan lens 63A through which a pair of beams generated by the laser diodes 54 and 56 pass. Each pre-scan lens 61A and 63A functions to redirect its corresponding pair of beams such that they converge at or near a common spot or location on a common polygon mirror facet. Each pre-scan lens 61A and 63A further functions to focus or converge each of its corresponding pair of beams in the process direction, without causing convergence of the beam in the scan direction.

The collimation assemblies 58A, 58B comprise substantially identical constructions, and the components and operation of the collimation assemblies 58A, 58B will be described with particular reference to the collimation assembly 58A, it being understood that the description is equally applicable to the collimation assembly 58B.

Figure 4:
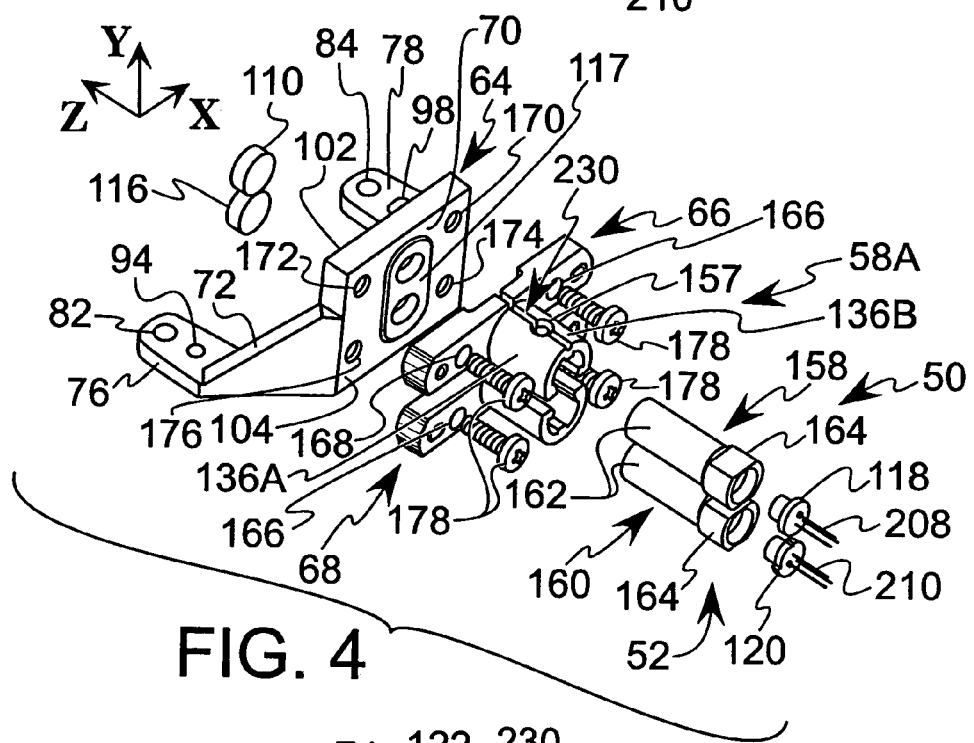
FIG. 4 is an exploded perspective view of one of the collimation assemblies.
Figure 6:
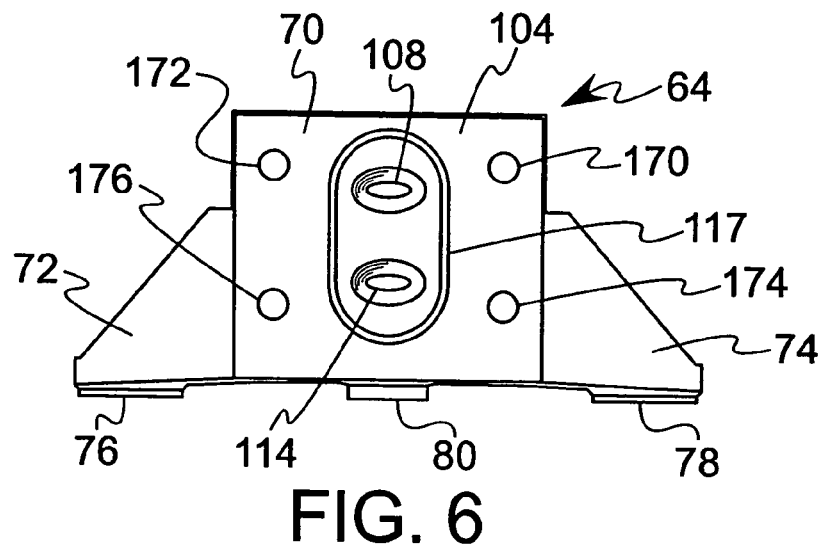
FIG. 6 is an elevation view of a rear side of a collimation housing for the collimation assembly.
Figure 7:
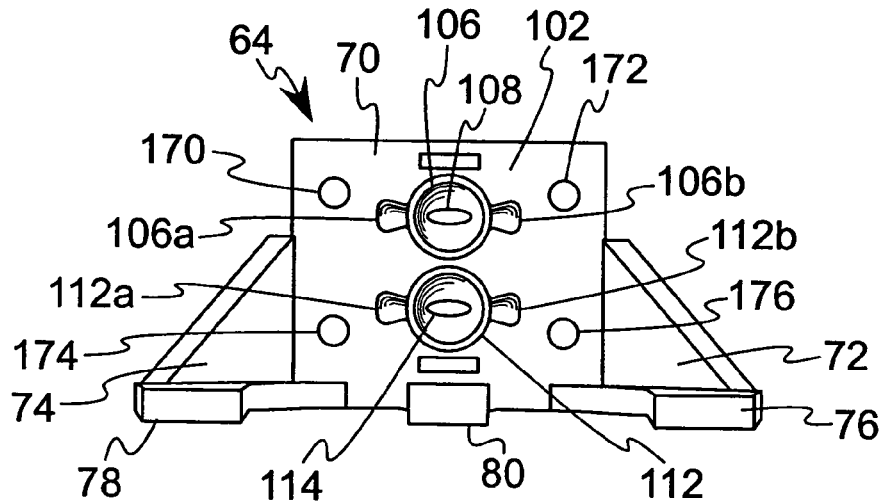
FIG. 7 is an elevation view of a front side of the collimation housing for the collimation assembly.

Referring to FIG. 4, the collimation assembly 58A comprises a collimation housing 64 supporting an upper adjustment bracket 66 and a lower adjustment bracket 68 adjacent to each other. Referring further to FIGS. 6 and 7, the collimation housing 64 includes a support plate 70, side plates 72, 74 extending at an angle outwardly from either side of the support plate 70, and a base portion comprising side base plates 76, 78 extending from the lower portions of side plates 72, 74 and a central base plate 80 extending from a central lower portion of the support plate 70 (see also FIG. 5). The side base plates 76, 78 and central base plate 80 each include a respective aperture 82, 84, 86 for receiving a respective fastener 88, 90, 92 (FIG. 2) for attaching the collimation assembly 58A to mounting datum surfaces of the printhead housing 35. The side base plate 76 additionally includes an aperture 94 for receiving an alignment peg 96 molded into the printhead housing 35, and the side base plate 78 includes a slot 98 for receiving an alignment peg 100 molded into the housing 35. The engagement of the aperture 94 and slot 98 with the alignment pegs 96, 100 facilitates alignment of the collimation housing 64 in the scan direction, and attachment of the fasteners 88, 90, 92 orients the collimation assembly 58A in a predetermined alignment in the cross-scan or process direction.

The support plate 70 includes a front side 102 and a rear side 104. As seen in FIG. 7, the front side 102 is formed with an upper collimation lens pocket 106 surrounding a light beam aperture 108 and is adapted to receive an upper collimation lens 110 (FIG. 4). Similarly, a lower collimation lens pocket 112 is formed on the front side 102 and surrounds a lower light beam aperture 114 and is adapted to receive a lower collimation lens 116. The upper and lower lenses 110, 116 are retained in the respective pockets 106, 112 by an adhesive or similar means applied at recesses 106a, 106b and 112a, 112b on either side of the pockets 106, 112. The rear side 104 of the support plate 70 includes a raised area 117 which extends around the apertures 108 and 114. The apertures 108, 114 are formed with an elliptical shape and are located between the collimation lenses 110, 116 and respective light sources 50, 52 comprising laser diodes 118, 120 (FIG. 4) to prevent or minimize stray light from one diode light source becoming imaged into the collimation lens for the adjacent diode light source, which could result in undesirable optical "cross-talk" between the video signals of the two adjacent light beams.

The adjustment brackets 66, 68 are formed with identical construction, and are described with reference to FIGS. 8 and 9. The adjustment brackets 66, 68 each include a generally planar adjustment plate 122 formed as an elongated rectangular member having front and rear faces 124, 126 and first and second elongated edges 128, 130 connecting the front and rear faces 124, 126. The front face 124 includes a recessed planar central portion 125 located below a plane defined by adjacent planar lateral portions 127, 129. In addition, first and second end portions 132, 134 extend between the front and rear faces 124, 126 at opposing ends of the adjustment brackets 66, 68. The first and second end portions 132, 134 are formed with recesses 132A and 134A for receiving gripping members for an alignment operation, as will be described further below.

The adjustment brackets 66, 68 each include a generally tubular mount member 136 beginning adjacent the front face 124 and extending rearwardly past the rear face 126, and defining an outer surface 138 and an inner surface 140. The mount member 136 is formed with a generally circular cross-section having an outer diameter D which may be greater than the height of the adjustment plate 122, as measured between the first and second elongated edges 128, 130 (see FIG. 10). The mount member 136 is located such that the outer surface 138 is located adjacent the first elongated edge 128, and a diametrically opposite portion 142 of the mount member 136 extends beyond the second elongated edge 130. An elongated slot or open portion 144 extends longitudinally along the diametrically opposite portion 142 of the mount member 136, extending from the adjustment plate 122 to a distal end 146 of the mount member 136. The slot portion 144 is defined between generally planar edges 148, 150 of the mount member 136, and the edges 148, 150 define a plane which is substantially tangential to a diameter defined by the inner surface 140.

In the illustrated embodiment, an area of reduced thickness 230 extends longitudinally along the outer surface 138 of the mount member 136 from the adjustment plate 122 to the distal end 146 of the mount member 136 and is located opposite to the portion 142. The area of reduced thickness 230 defines a flexible hinge between first and second sections 136A and 136B of the mount member 136 so as to allow the mount member 136 to flex, see FIG. 4. Further in the illustrated embodiment, the area of reduced thickness 230 extends through the plate 122. However, it is contemplated that the area of reduced thickness 230 may only extend along the mount member 136. For a mount member 136 having a wall thickness of from about 1.0 mm to about 1.7 mm, the area of reduced thickness 230 may have a thickness of between about 0.5 mm to about 1.2 mm.

Figure 8:
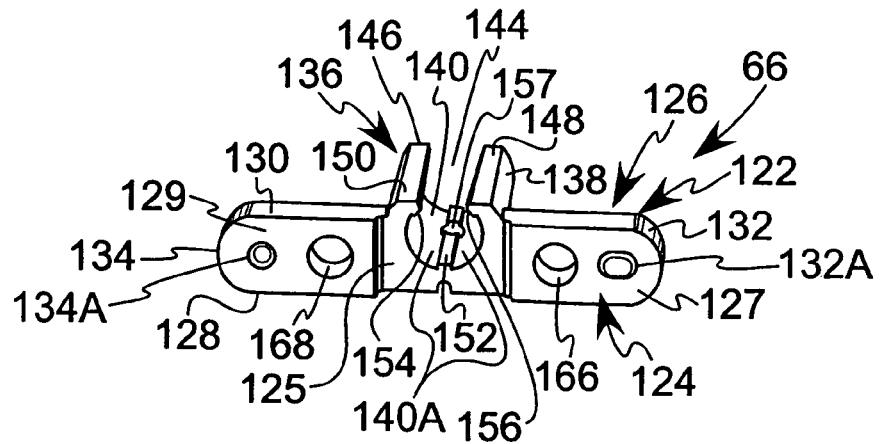
FIG. 8. is a perspective view of one of the adjustment brackets for the collimation assembly.

The inner surface 140 of the mount members 136 includes three longitudinally extending ribs 152, 154, 156 spaced apart approximately 120°, in a circumferential direction, and extending radially inwardly, see FIG. 8. In order to ensure rigidity of the mount members 136, the adjustment brackets 66, 68 are preferably formed of a reinforced plastic, such as a glass reinforced plastic, or of a cast metallic alloy such as zinc or aluminum. It should be noted that the mount members 136 may be provided with other cross-sectional shapes, such as an elliptical shape, to improve the optical quality of the light beams.

The mount member 136 of the upper adjustment bracket 66 receives the laser light source 50 comprising a laser diode holder 158 and the laser diode 118, see FIG. 4. Similarly, the mount member 136 of the lower adjustment bracket 68 receives the laser light source 52 comprising a laser diode holder 160 and the laser diode 120. Each laser diode holder 158, 160 includes a hollow cylindrical barrel 162, and a collar 164 located at one end of the barrel 162. The collars 164 of the laser diode holders 158, 160 are sized to receive a respective laser diode 118, 120 in a press friction fit.

Referring to FIG. 4, the laser diode holders 158, 160 are received and supported in the mount members 136 of the respective adjustment brackets 66 and 68. The barrels 162 of the laser diode holders 66, 68 are supported on the ribs 152, 154, 156 for sliding movement in a direction parallel to the longitudinal axis of the mount members 136 and parallel to the axes of the light beams produced by the laser diodes 118, 120. Because each mount member 136 is provided with an area of reduced thickness 230 defining a flexible hinge, the first and second sections 136A and 136B of each mount member 136 are capable of flexing apart when receiving a corresponding laser diode holder 66, 68.

To permit the light sources 50 and 52 to be accurately adjusted relative to the mount members 136 of the adjustment brackets 66 and 68, it is preferred that there be a "light slip fit" between each laser diode holder 158 and 160 and the portion of the mount member inner surface 140 contacting the corresponding laser diode holder 158, 160, i.e., the inner surface ribs 152, 154, 156 in the illustrated embodiment. The inner surface ribs 152, 154, 156 define a cylindrical area 153, shown in phantom in FIG. 10, for receiving a corresponding holder 158, 160. However, an outer diameter of the holder 158, 160 may vary within a predefined first tolerance range while a diameter of the cylindrical area 153 defined by the ribs 152, 154, 156 may vary within a predefined second tolerance range. So as to maintain a light slip fit between the inner surface ribs 152, 154, 156 of the mount member 136 and the holder 158, 160 for substantially any combination of parts falling within the first and second tolerance ranges, the first and second sections 136A and 136B of the mount member 136 flex via the hinge defined by the mount member area of reduced thickness 230 as the mount member 136 receives its corresponding holder 158, 160. Because the mount member 136 is capable of flexing, one or both of the first and second tolerance ranges may be expanded beyond the ranges which would have been acceptable with a mount member without a hinge.

In an alternative embodiment (not shown), the mount member inner surface may not include ribs such the inner surface defines a generally smooth cylindrical inner surface. Hence, each laser diode holder 158, 160 contacts generally the entirety of the inner surface of the mount member 136. In this embodiment, it is again preferred that there be a "light slip fit" between each laser diode holder 158 and 160 and the mount member inner surface 140 contacting the laser diode holder 158, 160.

Due to each mount member 136 including ribs 152, 154, 156 in the illustrated embodiment, a space is defined in each mount member 136 between portions 140A of the inner surface 140, see FIG. 8, located inwardly of the ribs 152, 154, 156 and the outer surface of the laser diode holder 158, 160. The mount members 136 each include an aperture 157 passing through the mount member 136 on a side opposite the slot portion 144. The apertures 157 are provided to allow application of an adhesive into the space defined in the mount members 136 to permanently locate the laser diode holders 158, 160 relative to the mount members 136 after the laser diode holders 158, 160 are adjusted in an axial direction, parallel to the axes of the light beams, to provide a desired spot size for each of the light beams emitted from collimation assembly 58A.

Figure 10:
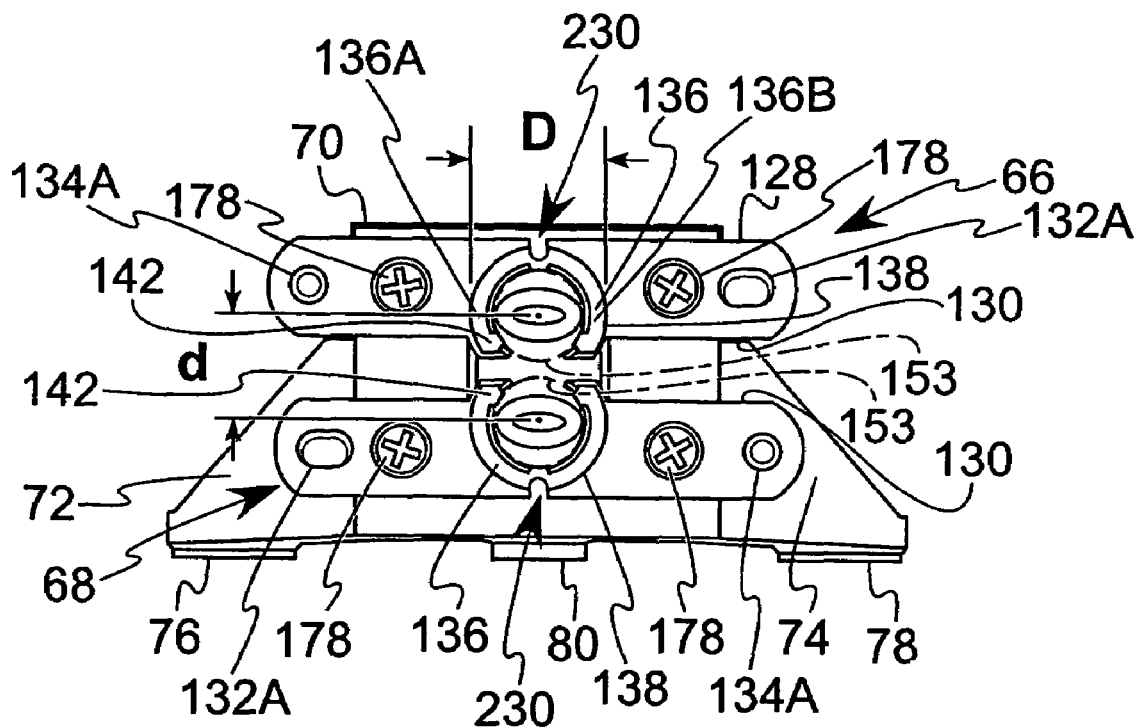
FIG. 10 is an elevation view of the rear side of the collimation housing having the adjustment brackets mounted in place.

The upper and lower adjustment brackets 66, 68 are supported on the support plate 70 with their second longitudinal edges 130 facing each other (FIG. 10), such that the slot portions 144 of the mount members 136 are located adjacent to each other. The slot portions 144 define cut-away sections at the portions 142 of the mount members 136 which permit the adjacent portions of the adjustment brackets 66, 68 to be located at a closer spacing than if the slot portions 144 were not provided. The closer spacing of the adjustment brackets 66, 68 positions the laser diodes 118, 120, and the corresponding light beam axes, at a closer spacing such that the laser light beams emitted from the collimation assembly will have a smaller angle of incidence at the polygonal mirror 38 in the cross-scan direction, thereby reducing the effects of manufacturing variations at the facets of the polygonal mirror 38 on the resulting imaging operation. The close spacing of the adjustment brackets is illustrated in FIG. 10 in which it can seen that, as a result of providing an area of reduced material where the mount members 136 of the upper and lower adjustment brackets 66, 68 face each other, the centers of the laser diodes 118, 120 may be positioned at a spacing d which is less than an outer diameter D defined by the mount members 136, i.e., less than the combined radii of the two adjacent mount members 136.

Figure 5:
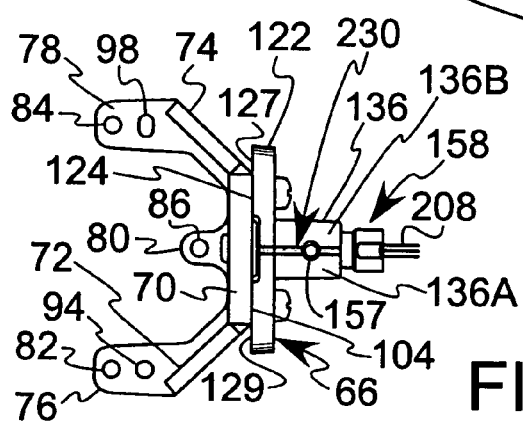
FIG. 5 is a top plan view of one of the collimation assemblies.

Referring to FIG. 5, the front face 124 of each adjustment bracket 66, 68 is supported with the planar lateral portions 127, 129 positioned in contact with the rear side 104 of the support plate 70. It should be noted that the central portion 125 of the front face 124 of each adjustment bracket 66, 68 provides a clearance between the adjustment brackets 66, 68 and the raised portion 117 of the rear side 104 of the support plate 70. Further, the lateral dimension of the raised portion 117 is less than the lateral dimension of the recessed central portions 125 of the adjustment brackets 66, 68 to accommodate movement of the adjustment brackets 66, 68 in the lateral direction.

Figure 9:
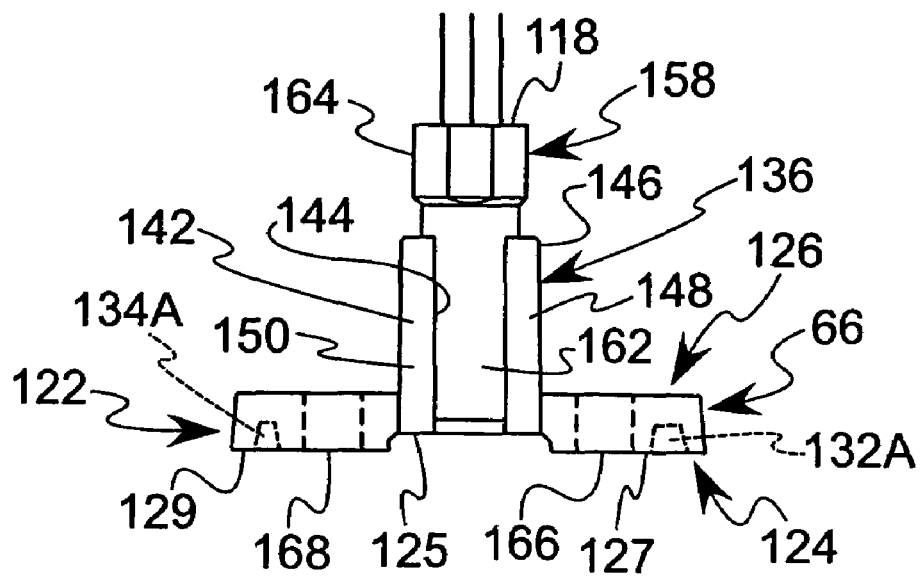
FIG. 9 is a bottom plan view of an upper adjustment bracket for the collimation assembly including a laser diode holder mounted to the adjustment bracket.

Referring further to FIGS. 8 and 9, the adjustment brackets 66, 68 each include a pair of mounting holes 166, 168, and the support plate 70 includes corresponding upper and lower sets of threaded holes 170, 172 and 174, 176. The adjustment brackets 66, 68 are held to the support plate 70 by screws 178 which pass through the mounting holes 166, 168 and threadably engage within the threaded support plate holes 170, 172 and 174, 176. The holes 166, 168 of the mounting brackets 66, 68 are oversized relative to the diameter of the screws 178 to permit movement of the adjustment brackets 66, 68 along two axes parallel to the plane of the support plate 70 and perpendicular to the axes of the light beams emitted by the laser diodes 118, 120. The movement of the adjustment brackets 66, 68 relative to the support plate 70 provides for adjustment of the axes of the light beams emitted by the laser diodes 118, 120 relative to their respective collimation lenses 110, 116, in order to compensate for manufacturing variations of the components of the collimation assembly 58A. In a preferred embodiment, the difference in diameter between the adjustment bracket holes 166, 168 and the screws 178 is approximately 1 mm, which provides adequate adjustment to align the laser light beams emitted through the collimation lenses 110, 116 on a vector parallel to a plane defined by mounting points in the printhead 35 engaged by the side base plates 76, 78 and central base plate 80 for supporting the collimation housing 64.

Figure 11:
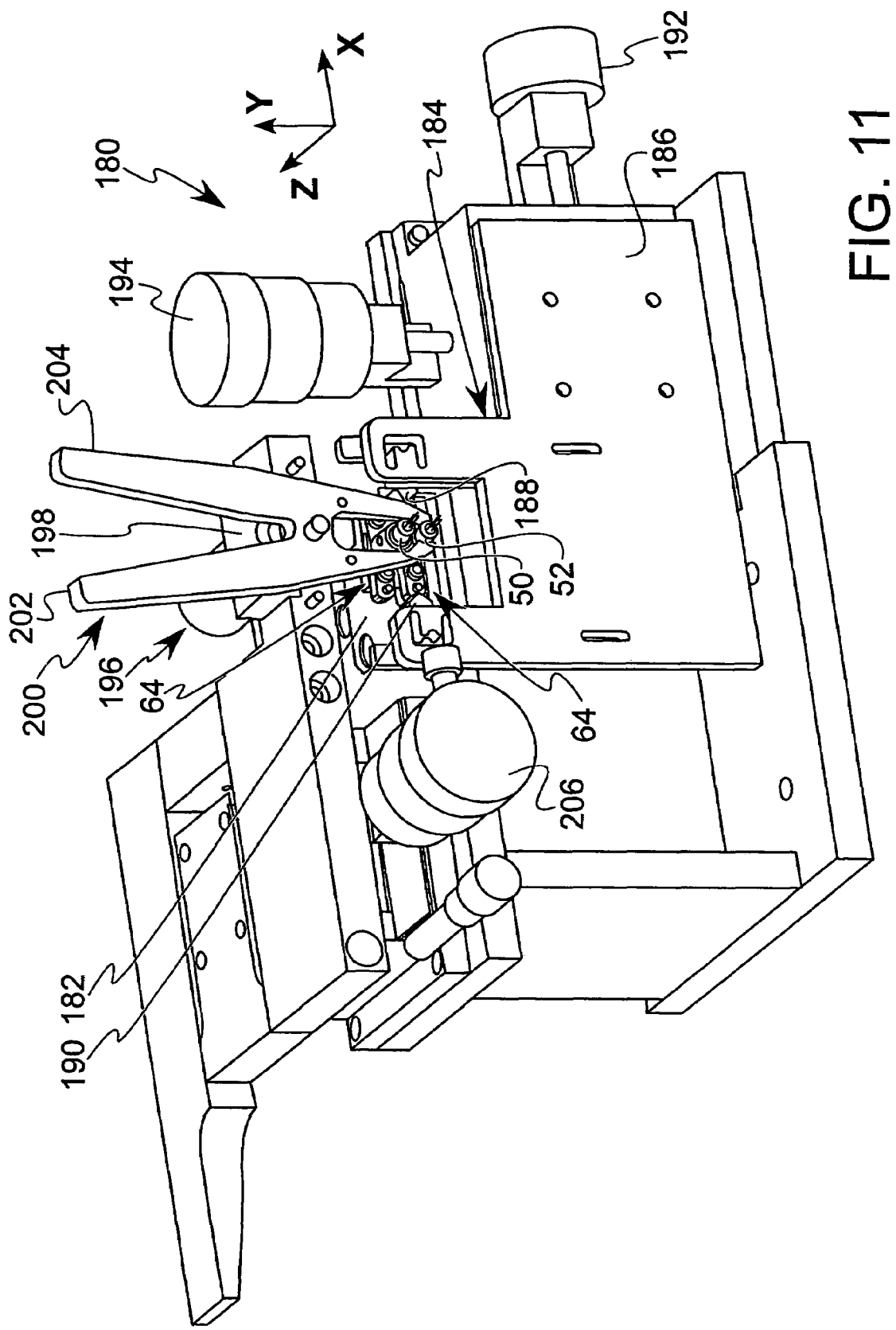
FIG. 11 is a diagrammatic perspective view of an adjustment fixture used for an alignment operation of the components of the collimation assembly.

Referring to FIG. 11, an exemplary diagram of an adjustment fixture 180 for adjusting the adjustment brackets 66, 68 and laser diode holders 158, 160 to precisely adjusted locations in the collimation assembly 58A is shown. The collimation housing 64 is mounted to a datum plate 182 of the fixture 180 by engagement of side base plates 76, 78 and central base plate 80 to the datum plate 182. An x-y axis adjuster 184 is supported for precisely controlled movement relative to the datum plate 182 and comprises a plate member 186 having gripper members 188, 190 provided with pins (not shown) for engaging the recesses 132A and 134A in the brackets 66 and 68, movable in an x-axis direction by a micrometer knob 192 and movable in a y-axis direction by a micrometer knob 194.

The fixture 180 further includes a z-axis adjuster 196 comprising a plate member 198 supporting a diode holder clamp 200 having a pair of spring biased jaws 202, 204 adapted for clamping the laser diode holders 158, 160. The diode holder clamp 200 is movable in the z-axis direction by a micrometer knob 206.

The process of adjusting each of the adjustment brackets 66, 68 comprises loosely mounting an adjustment bracket 66, 68 to the support plate 70 with a pair of the screws 178 and engaging the recesses 132A and 134A in the bracket 66 and 68 with corresponding pins of the gripper members 188, 190. In FIG. 11, the pins on the gripper members 188, 190 are not shown in engagement with the bracket recesses 132A, 134A. A power source (not shown) is connected to the leads of a corresponding laser diode 118, 120, and a device (not shown) for measuring beam size and position is positioned at a predetermined location from the collimation assembly 58A to detect and measure the beam emitted by the laser diode 118, 120. The plate member 186 is moved in the x and y directions by operation of the micrometer knobs 192, 194 to individually move an adjustment bracket 66, 68 relative to its respective collimation lens 110, 116 and align the vector of its corresponding light beam transmitted to the beam measuring device such that it is parallel to the plane of the datum plate 182. The screws 178 are then tightened to lock the aligned adjustment bracket 66, 68 in place. The position of the other bracket is then adjusted in the same manner. It should be noted that other methods of fixing the adjustment brackets 66, 68 in their final positions may be applied, such as through use of a UV activated adhesive or equivalent methods.

The process of adjusting the position of each laser diode holder 158, 160 in the z direction relative to its corresponding collimation lens 110, 116 comprises gripping a laser diode holder 158, 160 in the jaws 202, 204 of the diode holder clamp 200 and operating the micrometer knob 206 to move the gripped laser diode holder 158, 160 relative to its corresponding mount member 136 to focus it corresponding beam. Each beam is focused when its spot size, e.g., diameter, falls within a predefined range, such as between 38 microns and 42 microns. An adhesive is then applied through the aperture 157 into the area between the laser diode holder 158, 160 and the inner surface 140 of the respective mount member 136 to fasten the laser diode holder 158, 160 in position relative to the mount member 136. The position of the other laser diode holder 158, 160 is then adjusted relative to its corresponding mount member 136 in the same manner.

It should be noted that the adjustment fixture 180 is shown only for illustrative purposes to describe the operation of aligning the adjustment brackets 66, 68 and the laser diode holders 158, 160, and that other fixtures or structures may be used with the collimation assembly of the present invention for performing the alignment operation.

Figure 3:
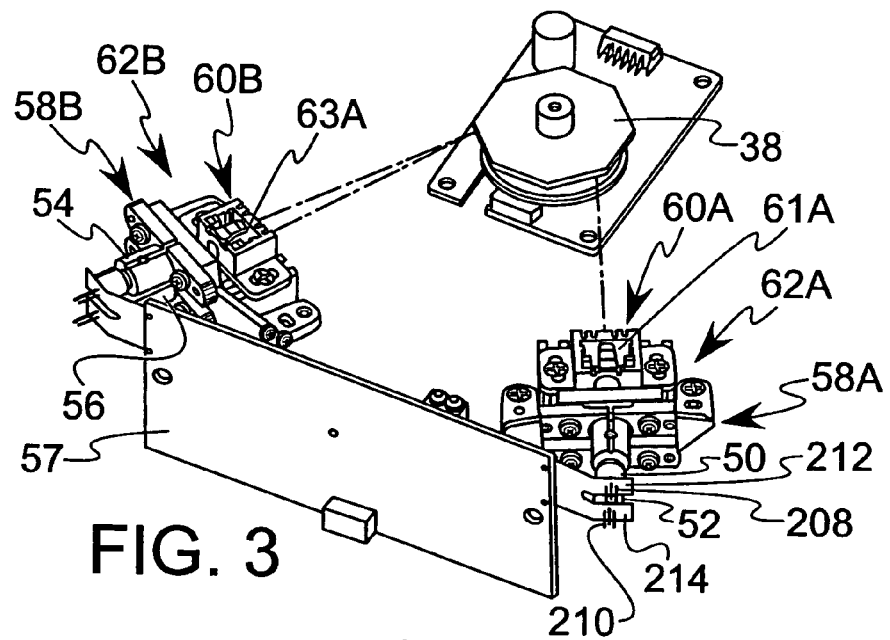
FIG. 3 is a diagrammatic perspective view of a portion of the printhead incorporating two of the collimation assemblies.

After alignment of the adjustment brackets 66, 68 and laser diode holders 158, 160, the collimation assembly 58A is moved from the adjustment fixture 180 to the printhead 35 where the collimation assembly 58A is properly aligned to the printhead 35 by engagement of side base plates 76, 78 and central base plate 80 to the datum surfaces of the printhead 35. Laser pulse signals for powering the laser diodes 118, 120 are provided from the controller 12 to the laser driver circuit board 57 connected to respective leads 208, 210 extending from the laser diodes 118, 120 (FIG. 3). The leads 208, 210 each comprise three lead wires extending from the laser diodes 118, 120 and which are connected to flexible circuit leads 212, 214 extending from the rigid circuit board 57. The flexible circuit leads 212, 214 are defined by thin, non-rigid flat conductive strips which flex to accommodate the different positions the laser diodes 118, 120 may assume relative to the circuit board 57 as a result of the positional adjustment of the adjustment brackets 66, 68 and the laser diode holders 158, 160 relative to the collimation housing 64.

EXAMPLE

Adjustment brackets 66 formed from Noryl HM 4025 (Trademark) were provided, each having a mount member 136 with an outer diameter D of about 10 mm, a wall thickness of about 1.5 mm, and inner surface ribs 152, 154, 156 defining a cylindrical area 153 or inner surface portion having a diameter of about 6.360+0.015 mm. A plurality of light sources 50 were provided, each having a laser diode holder 158 formed from 6061 drawn seamless aluminum tube T6 temper. A first group of laser diode holders 158 had outer diameters which were greater than the diameter of the cylindrical area 153 by amounts equal to 10 microns, 20 microns, 30 microns, and 40 microns, respectively. Each of the first group laser diode holders were inserted into mount members not including a flex hinge. A first plot provided in FIG. 12 illustrates the force required for inserting each of the laser diode holders from the first group into mount members having a cylindrical area 153 with a diameter equal to 6.360 mm and not including a hinge.

A second group of the laser diode holders 158 were inserted into adjustment brackets having a mount member provided with a hinge. An area of reduced thickness of the mount member defining the hinge had a material thickness of about 1.0 mm. The laser diode holders 158 of the second group had outer diameters which were greater than the diameter of a cylindrical area 153 defined by inner surface ribs 152, 154, 156 of each mount member by amounts equal to 10 microns, 20 microns, 30 microns, 40 microns, 50 microns, and 60 microns, respectively. A second plot provided in FIG. 12 illustrates the force required for inserting each of the laser diode holders from the second group into mount members having a cylindrical area 153 with a diameter equal to 6.360 mm and including a hinge.

A third group of the laser diode holders 158 were inserted into adjustment brackets having a mount member provided with a hinge. An area of reduced thickness of the mount member defining the hinge had a material thickness of about 0.5 mm. The laser diode holders 158 of the third group had outer diameters which were greater than the diameter of a cylindrical area 153 defined by inner surface ribs 152, 154, 156 of each mount member by amounts equal to 10 microns, 20 microns, 30 microns, 40 microns, 50 microns, 60 microns, and 70 microns, respectively. A third plot provided in FIG. 12 illustrates the force required for inserting each of the laser diode holders from the second group into mount members having a cylindrical area 153 with a diameter equal to 6.360 mm and including a hinge.

Figure 12:
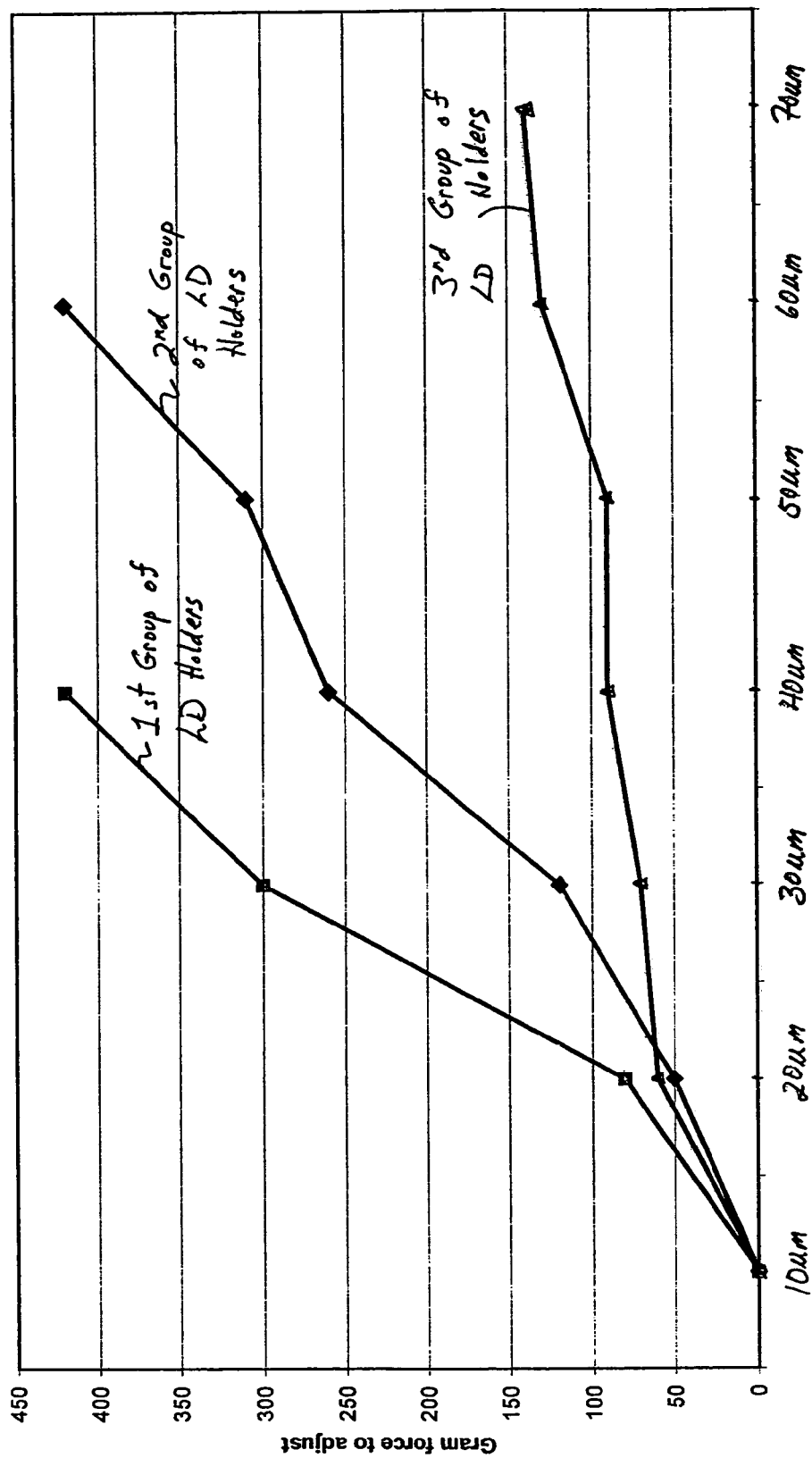
FIG. 12 provides a first plot illustrating the force required for inserting each of a plurality of laser diode holders from a first group into a mount member without a hinge, and a second plot illustrating the force required for inserting each of a plurality of laser diode holders from a second group into a mount member having a hinge.

As is apparent from FIG. 12, the force required to insert each laser diode holder 158 from the second and third groups into a mount member including a hinge was less than the force required to insert each laser diode holder 158 from the first group into a mount member without a hinge.

Having described the invention in detail and by reference to a preferred embodiment thereof, it will be apparent that modifications and variations are possible without departing from the scope of the invention defined in the appended claims.

What is claimed is:

1. A collimation assembly associated with a printhead housing for generating a substantially collimated laser beam, said collimation assembly comprising:
   a collimation housing mounted to said printhead housing to support a collimation lens;
   a light source generating a light beam; and
   an adjustment bracket located adjacent said collimation housing comprising a mount member for receiving said light source such that said light beam is directed toward said collimation lens, said mount member including first and second sections and a hinge defined between said first and second sections so as to allow said mount member to flex when receiving said light source between said first and second sections.

2. The collimation assembly of claim 1, wherein said adjustment bracket is movable relative to said collimation housing along two axes of movement transverse to an axis of said light beam.

3. The collimation assembly of claim 2, wherein said adjustment bracket includes holes through which fasteners extend to attach said adjustment bracket to said collimation housing, said holes comprising oversized holes for accommodating adjustment of said adjustment bracket relative to said collimation housing.

4. The collimation assembly of claim 1, wherein said light source is capable of moving in a direction parallel to an axis of said light beam to adjust the distance between said light source and said collimation lens.

5. The collimation assembly of claim 1, wherein said light source comprises a laser diode mounted within a generally cylindrical holder.

6. The collimation assembly of claim 5, wherein said mount member comprises a plurality of ribs for engaging said cylindrical holder.

7. The collimation assembly of claim 6, wherein said mount member includes a slot portion extending the length of said mount member.

8. The collimation assembly of claim 1, wherein said adjustment bracket further comprises a plate coupled to said mount member.

9. The collimation assembly as set out in claim 1, wherein said hinge defined between said first and second sections allows said first and second sections to flex apart when receiving said light source.

10. An adjustment bracket for use in a collimation assembly of a laser beam scanner, said adjustment bracket comprising:

a mount member for receiving and supporting a light source, said mount member including first and second sections and a hinge defined between said first and second sections to allow said mount member to flex when receiving said light source between said first and second sections.

11. The adjustment bracket of claim 10, wherein said mount member comprises a plurality of ribs for engaging said light source.

12. The adjustment bracket of claim 10, wherein said mount member includes a slot portion extending at least a portion of the length of said mount member.

13. The adjustment bracket of claim 10, further comprising a plate coupled to said mount member.

14. The adjustment bracket as set out in claim 10, wherein said hinge defined between said first and second sections allows said first and second sections to flex apart when receiving said light source.

15. The collimation assembly as set out in claim 9, wherein said mount member comprises a generally tubular mount member.

16. The adjustment bracket as set out in claim 14, wherein said mount member comprises a generally tubular mount member.

* * * * *